(12) United States Patent
Yen et al.

(10) Patent No.: US 7,184,404 B2
(45) Date of Patent: Feb. 27, 2007

(54) PROGRAMMABLE INTER-PACKET GAP GENERATOR WITH BYTE GRANULARITY

(75) Inventors: Johnson Yen, Fremont, CA (US); Michael Veng-Chong Lau, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1046 days.

(21) Appl. No.: 10/269,988

(22) Filed: Oct. 15, 2002

(65) Prior Publication Data

US 2004/0071166 A1    Apr. 15, 2004

(51) Int. Cl.
| H04J 1/16 | (2006.01) |
| H04J 3/12 | (2006.01) |
| H04Q 7/24 | (2006.01) |
| H04L 12/66 | (2006.01) |
| H04L 12/28 | (2006.01) |

(52) U.S. Cl. .......... 370/235.1; 370/338; 370/356; 370/389; 370/528

(58) Field of Classification Search ............ None
See application file for complete search history.

(56) References Cited

U.S. PATENT DOCUMENTS

| 5,278,789 A | 1/1994 | Inoue et al. |
| 5,404,353 A | 4/1995 | Ben-Michael et al. |
| 5,909,686 A | 6/1999 | Muller et al. |
| 5,978,384 A * | 11/1999 | Kotchey ............... 370/445 |
| 5,987,507 A | 11/1999 | Creedon et al. |
| 5,995,488 A * | 11/1999 | Kalkunte et al. ........ 370/232 |
| 6,175,902 B1 | 1/2001 | Runaldue et al. |
| 6,226,290 B1 | 5/2001 | Salett et al. |
| 6,937,624 B1 * | 8/2005 | Gavin ................ 370/528 |
| 7,061,866 B2 * | 6/2006 | Connor ............... 370/235 |
| 7,089,485 B2 * | 8/2006 | Azadet et al. .......... 714/798 |
| 7,095,737 B2 * | 8/2006 | Lo .................. 370/389 |

FOREIGN PATENT DOCUMENTS

| EP | 0752796 | 1/1997 |
| EP | 0907300 | 4/1999 |

* cited by examiner

*Primary Examiner*—Chi Pham
*Assistant Examiner*—Melanie Jagannathan
(74) *Attorney, Agent, or Firm*—Squire, Sanders & Dempsey, L.L.P.

(57) ABSTRACT

A process of generating an inter-packet gap in a network device is disclosed. First, it is determined whether a next packet is available to forward from a packet buffer. The number of tokens contained in a token bucket is checked and bytes are added to the inter-packet gap and tokens are added to the token bucket, when the number of tokens contained in a token bucket is less than a predetermined number of tokens. Otherwise, the size of the inter-packet gap is reduced and tokens are taken out of the token bucket, when the number of tokens contained in a token bucket is greater than or equal to the predetermined number of tokens. Thereafter, the inter-packet gap is supplied and sent with the next packet over an interface between the network device and a network.

21 Claims, 3 Drawing Sheets

PROGRAMMABLE INTER-PACKET GAP GENERATOR WITH BYTE GRANULARITY

BACKGROUND OF THE INVENTION

1. Field of Invention

The present invention relates to network devices that allow for data to be routed and moved in data communication or computer networks. The present invention further relates to high-speed network devices, such as network switches, routers, and repeaters. More specifically, the present invention is directed to methods and apparatuses that allow the speed of network traffic through the network device to be flexibly tuned with good granularity.

2. Description of Related Art

As computer performance has increased in recent years, the demands on data communication and computer networks has significantly increased; faster computer processors and higher memory capabilities need networks with high bandwidth capabilities to enable high speed transfer of significant amounts of data. In response to these changes, additional standards have been promulgated that allow for a greater throughput. The standards are important because network devices produced and supplied to implement and manage high speed data networks must use the same standards in order to transfer data between those network devices.

The 10 Gigabit Media Independent Interface (XGMII) is specified in the IEEE Draft P802.3ae (Ethernet standard specification for 10 Gigabit per second) to interface between IEEE 802.3 MAC entities and Physical Layer entities. The data bus width of XGMII is 32 bits (4 bytes) when applied on a double-edge clock or 64 bits (8 bytes) on a single-edge clock. The specification also discusses the value for the Inter-Packet Gap (IPG), where the IPG is the gap between two packets transmitted on an Ethernet network. The IPG value that is defined by the IEEE 802.3 standard is 12 bytes. However, the packet length is variable, so the last byte of the packet data can fall on any byte of a 4/8 byte bus. Moreover, the IEEE standard requires that the start frame delimiter must be placed at the location of byte 0. This has the effect that the IPG value cannot be fixed at a predefined value. Thus, the solution to fulfill the 12-byte IPG requirement by the IEEE 802.3 specification on the XGMII Interface is to have the IPG value vary in a range depending on the packet size, so that the average value will be proximate to the predefined value.

However, two issues arise when implementing the variation of the IPG value. First, a question arises as to how to smoothly shape each IPG value for any combination of packet sizes. One easy and common way to implement this requirement is to do it in a very approximate way. In other words, packets with a certain size or size range will have constant IPG values. An example of such a structure is illustrated in Table 1:

TABLE 1

| Packet size, multiples of: | IPG |
|---|---|
| 8 * n + 1 | 15 bytes |
| 8 * n + 2 | 14 bytes |
| 8 * n + 3 | 13 bytes |
| 8 * n + 4 | 12 bytes |
| 8 * n + 5 | 11 bytes |
| 8 * n + 6 | 10 bytes |
| 8 * n + 7 | 9 bytes |
| 8 * n | 8 or 16 bytes |

Specifically, packets with the size of a multiple of eight plus one (8*n+1), have the fixed IPG value of 15 bytes, etc. Therefore, if the packet size is evenly distributed in the range of (8*n) to (8*n+7) for a long period of time, then the average IPG value will become 12 bytes. However, packet sizes are not evenly distributed in many real applications. For instance, if most of packets have the size of 65 (8*n+1) bytes, then the average IPG will be approaching 15 bytes instead of 12 bytes. In order to solve this problem, a better way is needed to smooth out the IPG value to a predefined value for any combination of packet sizes.

Second, there is also the issue of how to make the IPG value programmable to have a finer granularity in terms the number of bytes in the IPG. A simple but widely employed way to program the value of IPG is to have a granularity of 4 bytes. However, some applications require finer, more flexible ways to program the IPG value, which is not fixed at the multiple of 4 bytes. One example of when this finer granularity is needed occurs when a XGMII device interfaces with fiber optic devices. The transfer speed of the compatible fiber optic device is actually a little slower than that of the XGMII device. An easy way to facilitate the traffic between these two unmatched-speed devices is to increase the value of IPG a little bit, such as 13 or 14 bytes, which requires a finer degree of granularity.

Another example illustrating the need for a finer granularity in the IPG occurs when the IPG needs to be smaller than 12 bytes and not be a multiple of four. Often, the 8-byte packet header (preamble and start frame delimiter) is replaced with some packet information, such as packet length, VLAN ID, service class, etc. It is possible that the replaced packet information is larger than 8 bytes and then IPG size will become less than 12 bytes to maintain the same traffic speed.

As such, there is a need for a method or mechanism in the prior art for a process and apparatus that can provide a programmable IPG with finer byte granularity.

SUMMARY OF THE INVENTION

It is an object of this invention to overcome the drawbacks of the above-described conventional network devices and methods. The present invention is directed to methods and apparatuses that employ a token bucket scheme to program the length of the IPG and to provide granularity to the IPG that is less than four bytes. When the End of Packet is received and the next packet is available to forward, the IPG Generator checks the number of tokens in the bucket, where the tokens represent bytes. If there are not enough tokens, then more bytes of IPG will be inserted and tokens will be added to the bucket. Otherwise, fewer bytes of IPG will be inserted and tokens will be taken out from the bucket. Since the bus width is 4/8 bytes and the start of frame delimiter must be placed at the byte 0, the number of inserted bytes for additional IPG is always the multiple of 4 or 8.

According to one aspect of this invention, a process of generating an inter-packet gap in a network device is disclosed. First, it is determined whether a next packet is available to forward from a packet buffer. The number of tokens contained in a token bucket is checked and bytes are added to the inter-packet gap and tokens are added to the token bucket, when the number of tokens contained in a token bucket is less than a predetermined number of tokens. Otherwise, the size of the inter-packet gap is reduced and tokens are taken out of the token bucket, when the number of tokens contained in a token bucket is greater than or equal to the predetermined number of tokens. Thereafter, the inter-packet gap is supplied and sent with the next packet over an interface between the network device and a network.

Alternatively, the process can supply the inter-packet gap to be sent with the next packet over the interface, where the interface has a bus width greater than or equal to thirty-two bits. The process of generating the inter-packet gap in the network device may be performed when an end of packet indicator of a previous packet is received or for every cycle of a clock coordinating the performance of the network device. Also, the step of adding bytes to the inter-packet gap can include adding bytes that are a multiple of one of four or eight bytes to the inter-packet gap. Additionally, the steps of adding tokens to the token bucket and taking tokens out of the token bucket can be performed in conjunction with a packet length evaluation of the next packet and a number of tokens added to and subtracted from is determined with respect to the packet length evaluation. Also, the process of generating the inter-packet gap in the network device may be performed such that a series of inter-packet gaps generated are shaped such that an average value for the series of inter-packet gaps approaches a predefined inter-packet gap value.

According to another embodiment of this invention, an inter-packet gap generator for a network device is disclosed. The generator includes determining means for determining whether a next packet is available to forward from a packet buffer and checking means for checking a number of tokens contained in a token bucket. The generator also includes adding means for adding bytes to the inter-packet gap and adding tokens to the token bucket, when the number of tokens contained in a token bucket is less than a predetermined number of tokens and reducing means for reducing a size of the inter-packet gap and taking tokens out of the token bucket, when the number of tokens contained in a token bucket is greater than or equal to the remainder of the packet length plus the predefined IPG divided by the BC value. The generator also includes supplying means for supplying the inter-packet gap to be sent with the next packet over an interface between the network device and a network.

In another embodiment, an inter-packet gap generator for a network device is disclosed. The generator includes an evaluator for determining whether a next packet is available to forward from a packet buffer and a checker for checking a number of tokens contained in a token bucket. The generator also includes an inserter for adding bytes to the inter-packet gap and adding tokens to the token bucket, when the number of tokens contained in a token bucket is less than a predetermined number of tokens and a reducer for reducing a size of the inter-packet gap and taking tokens out of the token bucket, when the number of tokens contained in a token bucket is greater than or equal to the remainder of the packet length plus the predefined IPG divided by the BC value. Additionally, the generator has a supplier for supplying the inter-packet gap to be sent with the next packet over an interface between the network device and a network.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

The present invention provides a solution to the problem of achieving a proper value for the IPG to comply with various requirements, such as the IEEE 802.3ae standard. The use of the token and bucket mechanism allows for the amount of the IPG to be finely tuned and allows for greater performance of the network for packets of various sizes. The general process of tuning the IPG is discussed first, an algorithm capable of performing the process of the present invention, according to one embodiment, is discussed and then several illustrative examples are provided for several different scenarios.

Figure 1:
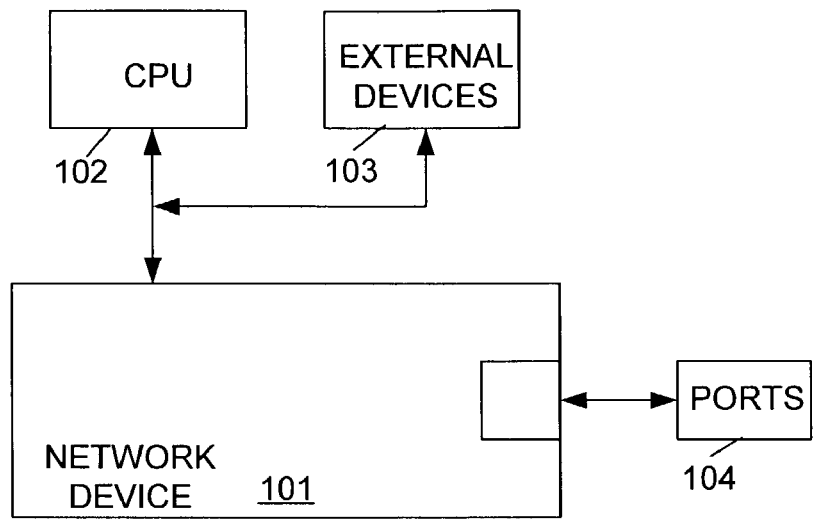
FIG. 1 is a general block diagram of a network device and associated modules for use with the present invention.

FIG. 1 illustrates a configuration of a node of the network, in accordance with one embodiment of the present invention. The network device 101 is connected to or in communication with a Central Processing Unit (CPU) 102 and other external devices 103. The CPU can be used as necessary to program the network device 101 with rules that are appropriate to control packet processing. Ideally, the network device 101 should be able to process data received through physical ports 104 with minimal interaction with the CPU and operate, as much as possible, in a free running manner.

Figure 2:
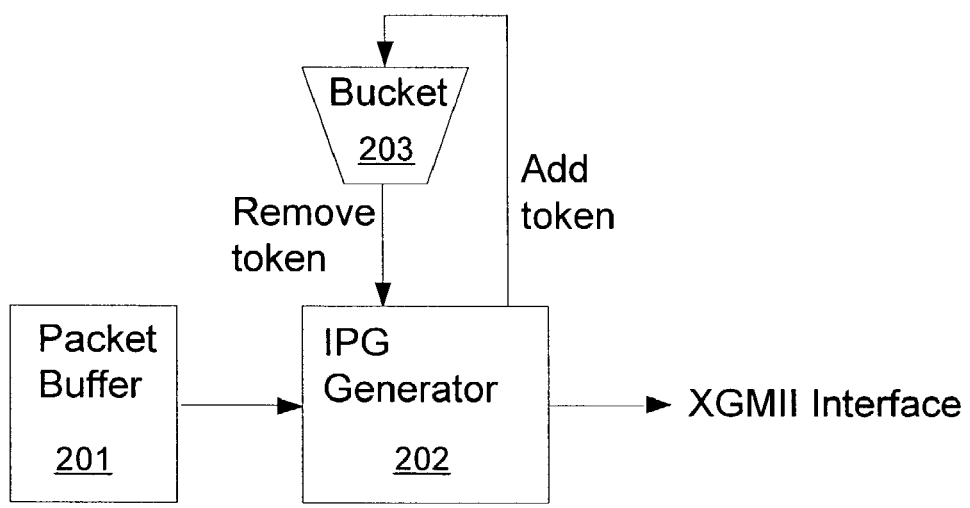
FIG. 2 illustrates a general block diagram of a programmable IPG generator, according to one embodiment of the present invention.

FIG. 2 illustrates a general block diagram of a programmable IPG generator, according to one embodiment of the present invention. A packet buffer 201 receives a packet for transmission from the network device. The packet data is forwarded through the IPG generator 202 so that a proper IPG can be determined. As discussed above, the IPG generator makes use of a bucket 203 that contains tokens. When the End of Packet is received and the next packet is available to forward, the IPG Generator checks the number of tokens in the bucket. If there are not enough tokens, then more bytes of IPG will be inserted and tokens will be added to the bucket. Otherwise, fewer bytes of IPG will be inserted and tokens will be taken out from the bucket. The IPG is executed through the XGMII interface, followed by the next packet that was available to be forwarded.

The processes of the present invention can be embodied in an algorithm that would be carried out in conjunction with the IPG generator. Pseudo code, representing this algorithm, is provided below according to one embodiment of the present invention. In the pseudo code representation, IPG_P represents a predefined IPG value, where its value is programmable in units of bytes. BC represents the number of bytes per cycle that is programmable and can be 4 or 8, based on the width of the bus and the application of the clock in the XGMII interface, according to this embodiment of the invention. IPG_c represents the current IPG count and IPG_r represents the remaining IPG bytes in the current cycle. Additionally, PL represents the length of the packet and TC represents the token count.

The pseudo code representation is:

```
Initialization:
    TC = 0;
For every Start of Packet:
    IPG_c = 0;
    For every cycle at and after End of Packet
        If ( (IPG_p – IPG_c < BC) and (TC ≥ ( (PL +
        IPG_p) % BC) ) and
                (next packet is available in the Packet Buffer) )
            begin
                    TC = TC – ( (PL + IPG_p) % BC).
                    Forward next packet;
            end
        Else if ( (IPG_c ≥ IPG_p) and
                (next packet is available in the Packet Buffer) )
            begin
                    TC = TC + BC – (PL % BC);
                    Forward next packet;
            end
        Else
                    IPG_c = IPG_c + IPG_r;
```

It is noted that the % operator represents the modulus operator, such that n % m presents the remainder left over when n is divided by m.

Figure 3:
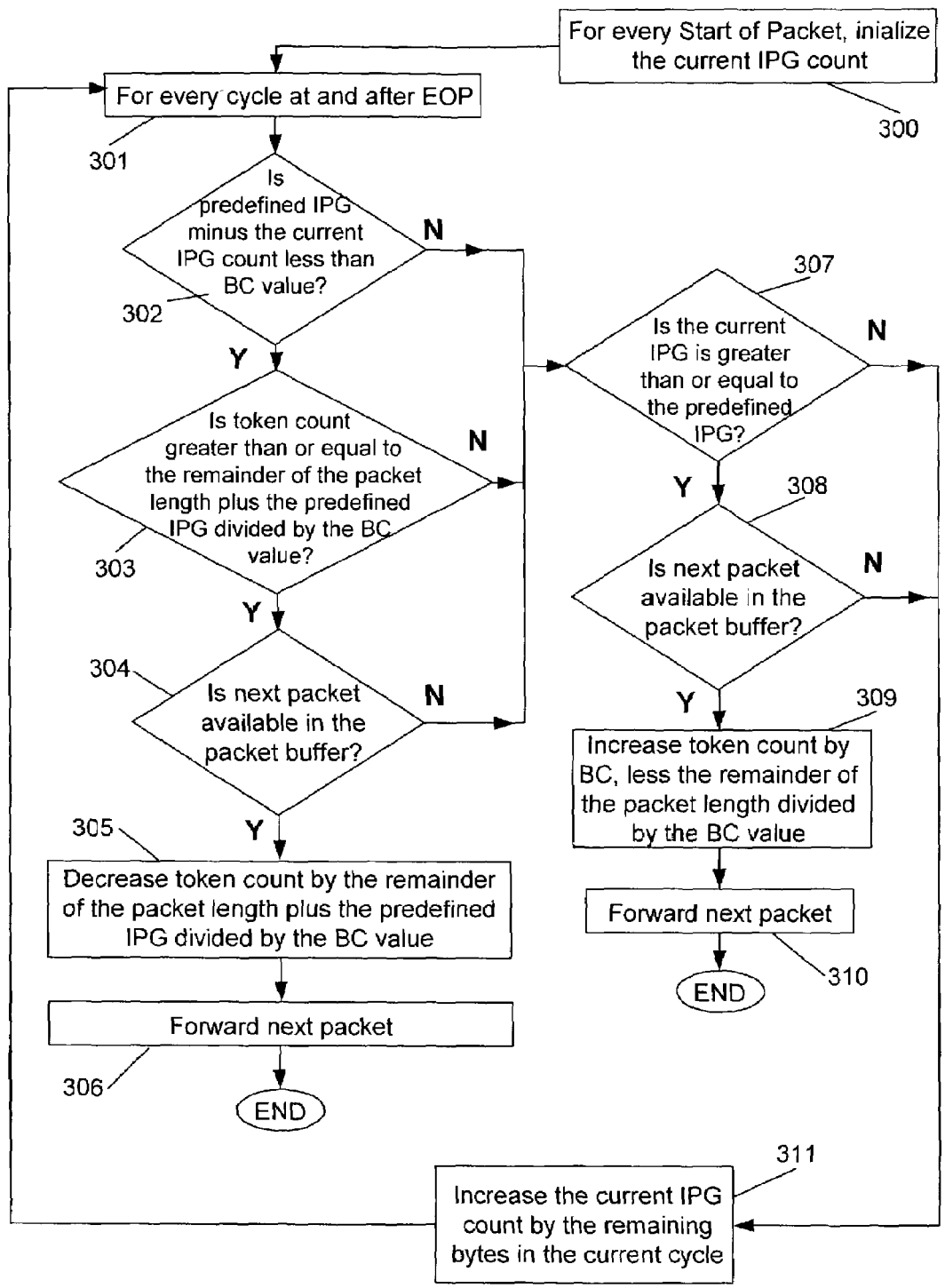
FIG. 3 illustrates a flowchart of the process of generating a proper IPG, according to one embodiment of the present invention.

The process is also discussed with respect to FIG. 3, where a flowchart of one embodiment of the present invention is illustrated. In step 300, for every Start of Packet, the current IPG count is set to zero. Then, in step 301, for every cycle at and after the End of Packet is received, the process proceeds to step 302. In step 302, it is determined whether a predefined IPG value less the current IPG count is less than the BC value. If the former is true, i.e. the response to the question posed in step 302 is yes, then, in step 303, it is determined whether the token count is greater than or equal to remainder left over from the division of the packet length plus the predefined IPG value by the BC value. If the statement in step 303 is found to be true, it is determined whether the next packet is available in the packet buffer, in step 304. If any of the above evaluations, steps 302, 303 or 304, are false, then the flow breaks off to step 307. If all of the above evaluations, steps 302, 303 or 304, are true, then the token count is decreased by the remainder left over from the division of the packet length plus the predefined IPG value divided by the BC value, in step 305. Thereafter, the next packet in the packet buffer is forwarded, step 306. The process ends until a new Start of Packet is received.

When the evaluations in steps 302, 303 or 304 are false, the process continues with step 307. In step 307, it is determined whether the current IPG is greater than or equal to the predefined IPG. If the statement in step 307 is true, the process proceeds to step 308, where it is determined whether the next packet is available in the packet buffer. If the next packet is available, then the token count is increased by BC, less the remainder of the packet length divided by the BC value. Thereafter, in step 310, the packet is forwarded. However if either of the evaluations in steps 307 and 308 is not true, the flow passes to step 311, where the current IPG count is increased by the remaining bytes in the current cycle. Thereafter, the process continues with step 301 and the remaining process steps are evaluated again.

The present invention will now be discussed with respect to several examples. In a first example, the predetermined IPG is set to 12 bytes and the XGMII bus width is 32 bits.

The following table shows 8 cases. Each case exemplifies the sequence of IPG values when packets with the fixed sizes of 64, 65, 66, 67, 68, 69, 70, 71 bytes, are being transmitted, respectively:

TABLE 2

| Packet Size (bytes) | Sequence of IPG |
|---|---|
| 64 | 12, 12, 12, 12, . . . |
| 65 | 15, 11, 11, 11, . . . |
| 66 | 14, 10, 14, 10, . . . |
| 67 | 13, 13, 13, 9, . . . |
| 68 | 12, 12, 12, 12, . . . |
| 69 | 15, 11, 11, 11, . . . |
| 70 | 14, 10, 14, 10, . . . |
| 71 | 13, 13, 13, 9, . . . |

In a second example, the predetermined IPG is set to 13 bytes and the XGMII bus width is 32 bits. Each case exemplifies the sequence of IPG values when packets with the fixed sizes of 64, 65, 66, 67, 68, 69, 70, 71 bytes, are being transmitted, respectively:

TABLE 3

| Packet Size (bytes) | Sequence of IPG |
|---|---|
| 64 | 16, 12, 12, 12, . . . |
| 65 | 15, 11, 15, 11, . . . |
| 66 | 14, 14, 14, 10, . . . |
| 67 | 13, 13, 13, 13, . . . |
| 68 | 16, 12, 12, 12, . . . |
| 69 | 15, 11, 15, 11, . . . |
| 70 | 14, 14, 14, 10, . . . |
| 71 | 13, 13, 13, 13, . . . |

In a third example, the predetermined IPG is set to 12 bytes and the XGMII bus width is 64 bits. The following table illustrates the case with packets having sizes incremented from 64 bytes to 71 bytes:

TABLE 4

| Packet Size (bytes) | Token Count | Sequence of IPG |
|---|---|---|
| 64 | 4 | 16 |
| 65 | 7 | 15 |
| 66 | 1 | 6 |
| 67 | 2 | 13 |
| 68 | 2 | 12 |
| 69 | 1 | 11 |
| 70 | 7 | 18 |
| 71 | 4 | 9 |
| 64 | 0 | 8 |
| 65 | 3 | 15 |
| 66 | 5 | 14 |
| 67 | 6 | 13 |
| 68 | 6 | 12 |
| 69 | 5 | 11 |
| 70 | 3 | 10 |
| 71 | 0 | 9 |

As illustrated in each example, the present invention allows the IPG generator to provide an IPG that takes into account varying combination of packet sizes. Additionally, the present invention also allows the IPG generator to be programmable to a finer granularity to the value of the IPG. Also, while the present invention has been discussed with respect to use with an XGMII, it is also applicable to other bus interfaces have wide widths.

Figure 4:
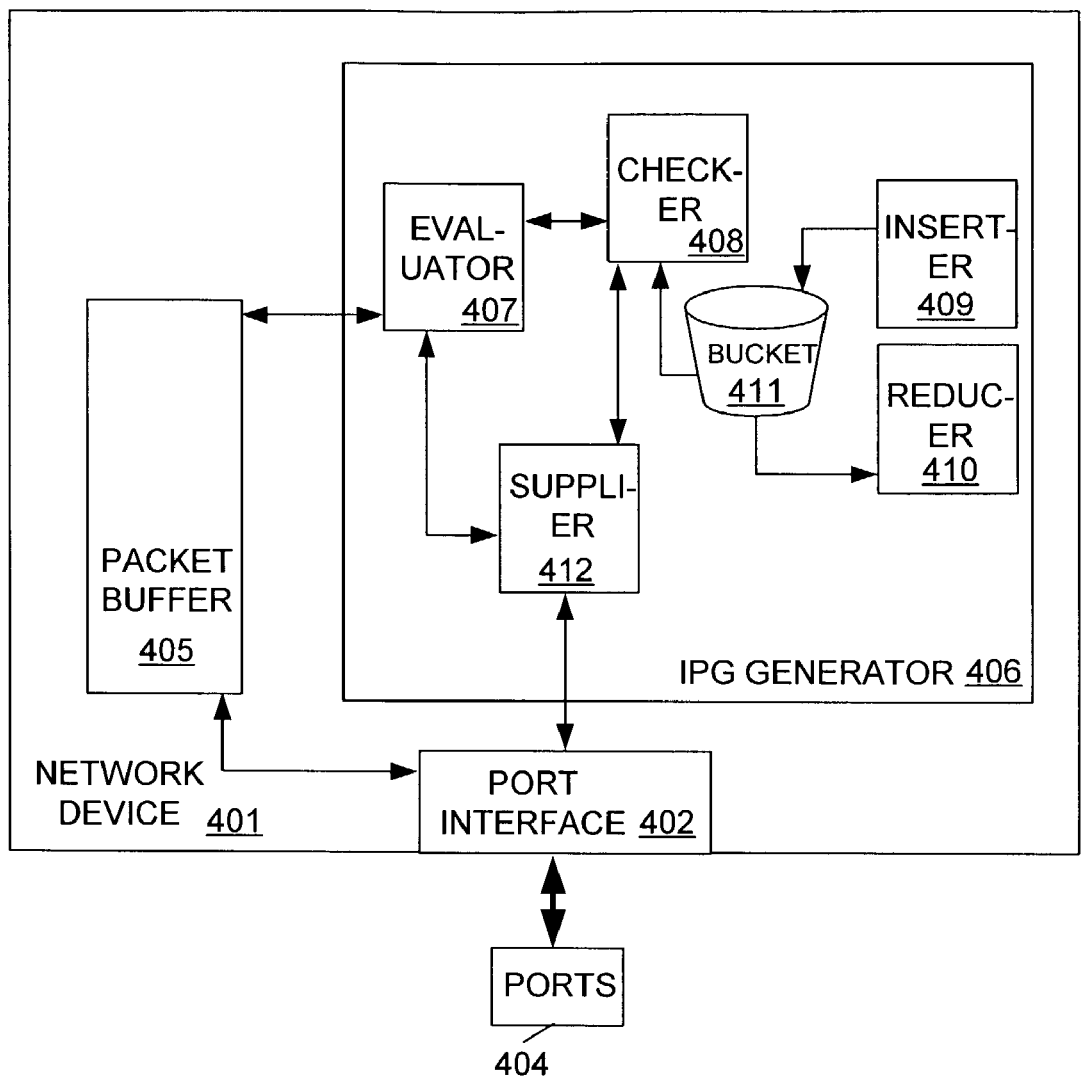
FIG. 4 illustrates a general block diagram of a network device having a programmable IPG generator, according to one embodiment of the present invention.

Another embodiment of the present invention is illustrated in FIG. 4. The network device 401 is illustrated as having an IPG generator 406 in communication with a packet buffer 405 and a port interface 402. The port interface 402 is in communication with the ports 404 that provide connections to the larger network. Logical portions of the IPG generator 406 include the evaluator 407 in communication with the supplier 412 and the checker 408. The checker 408 checks the level of tokens in the bucket 411, with the inserter 409 and the reducer 410, adding or subtracting, respectively, from the number of tokens in the bucket 411. The checker is also in communication with the supplier 412, that supplies the IPG to be executed with the next packet available in the packet buffer 405.

The above-discussed configuration of the invention is, in one embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and components, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

In addition, while the term packet has been used in the description of the present invention, the invention has import to many types of network data. For purposes of this invention, the term packet includes packet, cell, frame, datagram, bridge protocol data unit packet, and packet data.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A process of generating an inter-packet gap in a network device, said process comprising:
   determining whether a next packet is available to forward from a packet buffer;
   checking a number of tokens contained in a token bucket;
   adding bytes to the inter-packet gap and adding tokens to the token bucket, when the number of tokens contained in the token bucket is less than a predetermined number of tokens;
   reducing a size of the inter-packet gap and taking tokens out of the token bucket, when the number of tokens contained in the token bucket is greater than or equal to the predetermined number of tokens; and
   supplying the inter-packet gap to be executed with said next packet over an interface between the network device and a network.

2. A process as recited in claim 1, wherein said step of supplying the inter-packet gap comprises supplying the inter-packet gap to be executed with said next packet over said interface, where said interface has a bus width greater than or equal to thirty-two bits.

3. A process as recited in claim 1, wherein said process of generating the inter-packet gap in the network device is performed when an end of packet indicator of a previous packet is received.

4. A process as recited in claim 1, wherein said process of generating the inter-packet gap in the network device is performed for every cycle of a clock coordinating the performance of the network device.

5. A process as recited in claim 1, wherein said step of adding bytes to the inter-packet gap comprises adding bytes that are a multiple of one, of four or eight bytes to the inter-packet gap.

6. A process as recited in claim 1, wherein said steps of adding tokens to said token bucket and taking tokens out of said token bucket are performed in conjunction with a packet length evaluation of said next packet and a number of tokens added to and subtracted from is determined with respect to said packet length evaluation.

7. A process as recited in claim 1, wherein said process of generating the inter-packet gap in the network device is performed such that a series of inter-packet gaps generated are shaped such that an average value for said series of inter-packet gaps approaches a predefined inter-packet gap value.

8. An inter-packet gap generator for a network device, said inter-packet gap generator comprising:
   determining means for determining whether a next packet is available to forward from a packet buffer;
   checking means for checking a number of tokens contained in a token bucket;
   adding means for adding bytes to the inter-packet gap and adding tokens to the token bucket, when the number of tokens contained in the token bucket is less than a predetermined number of tokens;
   reducing means for reducing a size of the inter-packet gap and taking tokens out of the token bucket, when the number of tokens contained in the token bucket is greater than or equal to the predetermined number of tokens; and
   supplying means for supplying the inter-packet gap to be executed with said next packet over an interface between the network device and a network.

9. An inter-packet gap generator as recited in claim 8, wherein said supplying means for supplying the inter-packet gap comprises supplying means for supplying the inter-packet gap to be executed with said next packet over said interface, where said interface has a bus width greater than or equal to thirty-two bits.

10. An inter-packet gap generator as recited in claim 8, wherein said inter-packet gap generator further comprises evaluating means for evaluating when an end of packet indicator of a previous packet is received and said determining means is configured to determine whether the next packet is available to forward from the packet buffer when the evaluating means determines that the end of packet indicator of a previous packet has been received.

11. An inter-packet gap generator as recited in claim 8, wherein said inter-packet gap generator further comprises evaluating means for evaluating when a cycle of a clock coordinating the performance of the network device has elapsed and said determining means is configured to determine whether the next packet is available to forward from the packet buffer when the evaluating means determines that the cycle of a clock coordinating the performance of the network device has elapsed.

12. An inter-packet gap generator as recited in claim 8, wherein said adding means for adding bytes to the inter-packet gap comprises adding means for adding bytes that are a multiple of one, of four or eight bytes to the inter-packet gap.

13. An inter-packet gap generator as recited in claim 8, further comprising a packet length evaluation means for evaluating the packet length of said next packet and wherein said adding means and said reducing means are configured to select a number of tokens added to and subtracted from said token bucket determined with respect to said packet length.

14. An inter-packet gap generator as recited in claim 8, wherein said inter-packet gap generator is configured to generate a series of inter-packet gaps shaped such that an average value for said series of inter-packet gaps approaches a predefined inter-packet gap value.

15. An inter-packet gap generator for a network device, said inter-packet gap generator comprising:
- an evaluator for determining whether a next packet is available to forward from a packet buffer;
- a checker for checking a number of tokens contained in a token bucket;
- an inserter for adding bytes to the inter-packet gap and adding tokens to the token bucket, when the number of tokens contained in the token bucket is less than a predetermined number of tokens;
- a reducer for reducing a size of the inter-packet gap and taking tokens out of the token bucket, when the number of tokens contained in the token bucket is greater than or equal to the predetermined number of tokens; and
- a supplier for supplying the inter-packet gap to be executed with said next packet over an interface between the network device and a network.

16. An inter-packet gap generator as recited in claim 15, wherein said supplier comprises a supplier for supplying the inter-packet gap to be executed with said next packet over said interface, where said interface has a bus width greater than or equal to thirty-two bits.

17. An inter-packet gap generator as recited in claim 15, wherein said inter-packet gap generator further comprises an end of packet evaluator for evaluating when an end of packet indicator of a previous packet is received and said evaluator is configured to determine whether the next packet is available to forward from the packet buffer when the end of packet evaluator determines that the end of packet indicator of a previous packet has been received.

18. An inter-packet gap generator as recited in claim 15, wherein said inter-packet gap generator further comprises a clock cycle evaluator for evaluating when a cycle of a clock coordinating the performance of the network device has elapsed and said evaluator is configured to determine whether the next packet is available to forward from the packet buffer when the clock cycle evaluator determines that the cycle of a clock coordinating the performance of the network device has elapsed.

19. An inter-packet gap generator as recited in claim 15, wherein said inserter comprises an inserter for adding bytes that are a multiple of one, of four or eight bytes to the inter-packet gap.

20. An inter-packet gap generator as recited in claim 15, further comprising a packet length evaluator for evaluating the packet length of said next packet and wherein the inserter and the reducer are configured to select a number of tokens added to and subtracted from said token bucket determined with respect to said packet length.

21. An inter-packet gap generator as recited in claim 15, wherein said inter-packet gap generator is configured to generate a series of inter-packet gaps shaped such that an average value for said series of inter-packet gaps approaches a predefined inter-packet gap value.

* * * * *